UNITED STATES PATENT OFFICE.

HERBERT DU CANE, OF DARWEN, ENGLAND.

COMPOSITION OF MATTER FOR CLOSING PUNCTURES IN TIRES.

SPECIFICATION forming part of Letters Patent No. 608,956, dated August 9, 1898.

Application filed March 14, 1898. Serial No. 673,802. (No specimens.)

*To all whom it may concern:*

Be it known that I, HERBERT DU CANE, a subject of Her Majesty the Queen of Great Britain, residing at Darwen, in the county of Lancaster, England, have invented a new and useful Composition of Matter to be Used for Automatically Closing Punctures in Pneumatic Tires, of which the following is a specification.

This invention relates to an improved solution or combination of ingredients for automatically closing and sealing punctures or holes in air-tubes of pneumatic tires. The solution also acts as a tire preservative by strengthening and preserving the air-tube.

According to this invention the solution consists of the following ingredients in about the under-mentioned proportions: two hundred and seven parts of sugar, preferably best brown cane sugar, but in the term "sugar" I include its kindred substances molasses and black treacle; nine and one-fourth parts of rice starch or other starch; ninety-two parts of water, and two parts of burnt sugar, or a sufficient quantity of other coloring-matter.

The solution is prepared as follows: The sugar is mixed with sixty-four parts of water and boiled until in a thick syrupy mass. The starch is then mixed with twelve parts of cold water and poured into the sugar-and-water mixture when boiling and kept constantly stirred for ten minutes. The burnt sugar or other coloring-matter is then mixed with sixteen parts of water and stirred with the previous mixture until the whole is mixed. The product is allowed to become quite cold, and the solution is ready for use or bottling.

For large wheels, such as are used on carriages and heavy vehicles, it is desirable that a small quantity of an insoluble substance in a slightly granular condition, such as plaster-of-paris, should be mixed with the solution. The plaster-of-paris or other insoluble substance may be added during the preparation of the solution and is for the purpose of forming a nucleus around which the solution may the better coagulate.

A small quantity of the solution is inserted into the air-tube through the ordinary valve, and the tire is then inflated, as usual, and the wheel revolved a few times.

What I claim is—

1. The herein-described composition of matter consisting of sugar, starch, water, a granular insoluble substance such as plaster-of-paris, and a coloring-matter, substantially as described, and for the purpose specified.

2. The herein-described composition of matter for automatically closing punctures in pneumatic tires, consisting of sugar two hundred and seven parts, starch nine and a quarter parts, water ninety-two parts, and a coloring-matter in sufficient quantity, substantially as described.

In testimony whereof I have hereunto set my hand in the presence of two subscribing witnesses.

HERBERT DU CANE.

Witnesses:
I. B. HOWARD,
WM. H. TUNSTALL.